(12) United States Patent
Junge et al.

(10) Patent No.: US 9,197,116 B2
(45) Date of Patent: Nov. 24, 2015

(54) ANNULAR ROTOR FOR AN ELECTRIC MACHINE

(75) Inventors: Martin Junge, Grafenau (DE); Andreas Jöckel, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 773 days.

(21) Appl. No.: 13/383,748

(22) PCT Filed: Jul. 7, 2010

(86) PCT No.: PCT/EP2010/059705
§ 371 (c)(1),
(2), (4) Date: Jan. 12, 2012

(87) PCT Pub. No.: WO2011/006810
PCT Pub. Date: Jan. 20, 2011

(65) Prior Publication Data
US 2012/0112466 A1    May 10, 2012

(30) Foreign Application Priority Data
Jul. 13, 2009   (DE) .......................... 10 2009 032 885

(51) Int. Cl.
*H02K 1/06*   (2006.01)
*H02K 15/16*  (2006.01)
*H02K 1/27*   (2006.01)
*H02K 7/18*   (2006.01)
*H02K 15/02*  (2006.01)
*H02K 5/18*   (2006.01)
*H02K 15/03*  (2006.01)

(52) U.S. Cl.
CPC ................ *H02K 15/16* (2013.01); *H02K 1/276* (2013.01); *H02K 1/2786* (2013.01); *H02K 7/1838* (2013.01); *H02K 15/02* (2013.01); *H02K 5/18* (2013.01); *H02K 15/03* (2013.01); *H02K 2213/09* (2013.01); *H02K 2213/12* (2013.01); *Y02E 10/721* (2013.01); *Y02E 10/725* (2013.01); *Y10T 29/49009* (2015.01)

(58) Field of Classification Search
CPC ................................. F03D 9/002; F03D 1/005
USPC .................. 290/44, 55; 310/156.53, 216.008
See application file for complete search history.

(56) References Cited

U.S. PATENT DOCUMENTS

| 4,319,865 A * | 3/1982 | Richard .......................... 416/41 |
| 5,315,159 A * | 5/1994 | Gribnau .......................... 290/55 |
| 6,868,793 B2 | 3/2005 | Hoffman et al. |
| 6,938,555 B2 | 9/2005 | Jöckel |

(Continued)

FOREIGN PATENT DOCUMENTS

| CN | 101 237 204 A | 8/2006 |
| DE | 100 58 911 A1 | 5/2002 |

(Continued)

*Primary Examiner* — Naishadh Desai
(74) *Attorney, Agent, or Firm* — Henry M. Feiereisen LLC.

(57) ABSTRACT

The invention relates to an annular rotor having a hollow shaft for an electric machine. In order to allow transport of such a machine, particularly for a very large model, the rotor is divided in the circumferential direction into a plurality of partial annular rotor segments (1). The rotor further comprises a hollow shaft, wherein the closed ring shape of the rotor can be broken by separating the rotor segments (1) from each other.

20 Claims, 3 Drawing Sheets

(56) References Cited

U.S. PATENT DOCUMENTS

| | | | |
|---|---|---|---|
| 7,042,109 B2 * | 5/2006 | Gabrys | 290/44 |
| 7,090,465 B2 * | 8/2006 | Flamang et al. | 416/170 R |
| 7,262,526 B2 | 8/2007 | Shiga et al. | |
| 7,633,205 B2 | 12/2009 | Hoffmann et al. | |
| 7,808,149 B2 | 10/2010 | Pabst et al. | |
| 7,816,824 B2 | 10/2010 | Jöckel | |
| 7,948,134 B2 | 5/2011 | Jöckel et al. | |
| 8,222,792 B2 * | 7/2012 | Platon et al. | 310/266 |
| 2006/0279146 A1 * | 12/2006 | Ishigami et al. | 310/71 |
| 2007/0290582 A1 * | 12/2007 | Han et al. | 310/68 R |
| 2008/0246362 A1 | 10/2008 | Hirzel | |
| 2009/0134627 A1 | 5/2009 | Stiesdal | |
| 2009/0218900 A1 * | 9/2009 | Dickes | 310/156.12 |
| 2009/0234548 A1 | 9/2009 | Bergner et al. | |
| 2011/0273048 A1 * | 11/2011 | Jore et al. | 310/156.37 |
| 2012/0261920 A1 | 10/2012 | Aso et al. | |

FOREIGN PATENT DOCUMENTS

| | | | |
|---|---|---|---|
| DE | 102 56 735 A1 | 12/2003 | |
| DE | 10 2004 031 329 A1 | 1/2006 | |
| DE | 10 2005 029 895 A1 | 1/2007 | |
| DE | 10 2006 061 372 A1 | 6/2008 | |
| DE | 10 2008 004 225 A1 | 7/2009 | |
| EP | 1 536 543 A1 | 6/2005 | |
| EP | 2 063 117 A1 | 5/2009 | |
| EP | 2 169 814 A1 | 3/2010 | |
| JP | 2000-50538 | 2/2000 | |
| JP | 2000-224790 A | 8/2000 | |
| JP | 2001-119872 A | 4/2001 | |
| JP | 2009-024842 A | 2/2009 | |
| WO | WO 01/21956 A1 | 3/2001 | |
| WO | WO 03/073583 A1 | 9/2003 | |
| WO | WO2006/032969 | 3/2006 | |
| WO | WO 2006032969 A2 * | 3/2006 | H02K 1/18 |
| WO | WO 2011/055592 | 12/2011 | |

* cited by examiner

ANNULAR ROTOR FOR AN ELECTRIC MACHINE

CROSS-REFERENCES TO RELATED APPLICATIONS

This application is the U.S. National Stage of International Application No. PCT/EP2010/059705, filed Jul. 7, 2010, which designated the United States and has been published as International Publication No. WO 2011/006810 and which claims the priority of German Patent Application, Serial No. 10 2009 032 885.8, filed Jul. 13, 2009, pursuant to 35 U.S.C. 119(a)-(d).

BACKGROUND OF THE INVENTION

The invention relates to an annular rotor having a hollow shaft for an electric machine. The invention will be used in particular for very large electric machines such as, for example, gearless generators for wind-power plants.

As gearless wind-energy plants move to higher performance categories they are increasingly able to compete with geared plants. The rotor hub is linked directly to a synchronous generator in gearless wind-energy plants. The chief advantage of such a design is its much simpler structure requiring fewer rotating machine components compared with wind-power plants having a generator. Reduced maintenance costs and increased plant availability are the result.

In particular very large wind-power plants operate as a rule at very low speeds. Such plants must therefore in a gearless embodiment be fitted with very large and heavy generators. The diameter of these machines will then easily exceed the limit of 4 to 5 m.

Generators for gearless wind-power plants frequently include an annular rotor having a hollow shaft. Such an electric machine is known from, for instance, WO 2006/032969 A2. That publication discloses a rotor that is subdivided into a plurality of segments, with the segments having been pushed onto a rotor ring of the rotor.

Wind-power generators are becoming more and more difficult to install because of the increasing size perforce accompanying these plants higher output ratings. However, gearless turbines of wind-power or tidal power stations also pose major challenges in transportation and logistics terms.

SUMMARY OF THE INVENTION

The object of the invention is hence to make large electric machines easier to transport.

This object is achieved by an electric machine having an annular rotor, with the rotor being subdivided circumferentially into a plurality of partially annular rotor segments and having a hollow shaft, with the rotor's closed ring shape able to be dissolved by separating the rotor segments from each other, and a stator that is subdivided circumferentially into a plurality of partially annular stator segments (5), with the number of stator segments (5) being the same as the number of rotor segments.

The object is further achieved by means of a method for producing an electric machine having the following steps of the method:
i) A plurality of partially annular rotor segments are fitted with permanent magnets,
ii) a plurality of partially annular stator segments are fitted with coils,
iii) in each case one of the partially annular rotor segments is joined to in each case one partially annular stator segment to form a partially annular machine element, and
iv) machine elements produced according to step iii) are joined to form a closed ring.

Advantageous embodiment variants of the invention are cited in the subclaims.

The invention's central notion is to subdivide the rotor of the electric machine, which is in particular a permanently excited synchronous machine, circumferentially into a plurality of partially annular rotor segments. This subdividing is done preferably along radial parting lines similarly to how a flan is divided into individual slices. The hollow-shaft rotor's closed ring shape will be dissolved when the inventive annular rotor is disassembled into its rotor segments. The rotor will in its disassembled form occupy significantly less volume than a complete annular rotor. Even disassembling it into just two partially annular rotor segments each spanning a 180° arc will result in a significant volume reduction that can enable such a rotor to be transported by road.

Each rotor segment has in an advantageous embodiment of the invention at least one permanent magnet. In particular a permanently excited synchronous machine will be provided thereby. The use of permanent magnets on the rotor for generating an exciting field has the advantage that no electric links will need to be provided between the individual rotor segments when they are being assembled into the annular rotor. The permanent magnets can each be pasted onto the rotor segments or, in an advantageous embodiment of the invention, can be located in magnet pouches located on the rotor segments.

In a further advantageous embodiment of the invention it is also possible to dispense with mechanically linking the individual rotor segments to each other if the rotor includes on each of its two front sides an annular flange to which the rotor segments are joined. This flange can be, for example, a wind-power plant's turbine flange. The partially annular rotor segments could therein be individually mounted onto the turbine's flange directly at the construction site.

Economic production of the rotor segments can be ensured by an embodiment variant of the invention in which the rotor segments include partially annular magnetic steel sheets stacked in the rotor's axial direction. Hysteresis and eddy-current losses in the rotor will be reduced through the rotor's being constructed from mutually insulated individual magnetic steel sheets.

The invention will enable the rotor to be embodied as both an internal and an external rotor.

A complete generator or complete motor as a rule has to be transported to the site of its subsequent use. An advantageous embodiment of the invention is accordingly characterized by an electric machine having a rotor in keeping with one of the previously described embodiment variants and having a stator that is circumferentially subdivided into a plurality of partially annular stator segments, with the number of stator segments being the same as the number of rotor segments. The individual stator segments are preferably spaced mutually apart via radially oriented parting lines. Such a structure will enable the electric machine to be delivered and installed on a paired basis. That means that one rotor segment will initially be transported to the site of its subsequent use as a pair together with an associated stator segment. These rotor-/stator-segment pairs referred to also as machine elements in the further course of the invention will then be joined together to form the complete electric machine.

Such paired delivery of stator and rotor segments will in the case particularly of permanently excited electric machines enable the very strong permanent magnets to be handled far more easily. Very strict safety requirements must be adhered to when machine parts fitted with permanent magnets are being transported because of their enormous forces of attraction. The permanent magnets will, though, already be magnetically shielded from their environment through the rotor segment's being coupled to the stator segment and so will no longer constitute such a major hazard. The electric machine will also be far simpler to install if the rotor and stator segments are mounted together in pairs.

What is therein advantageous is an embodiment of the invention in which the electric machine includes for each rotor segment a stator segment whose arc-shaped circumference has a substantially identical central angle. The machine elements thus resulting are likewise arc-shaped so that joining them will produce an electric machine having a hollow-shaft rotor.

The partially annular rotor segments are initially fitted with the permanent magnets when the electric machine is being inventively produced and the partially annular stator segments are then fitted with coils for generating the armature field. The already mentioned likewise partially annular machine elements are then produced by in each case joining a rotor segment fitted with permanent magnets to a partially annular stator segment fitted with the coils. The stator segment and rotor segment are therein joined together by means of, for example, suitable connecting elements in such a way as to be spaced apart via the air gap separating the stator and rotor from each other in the electric machine's assembled condition.

Such a machine element can then be transported to the site of its subsequent use far more easily than is possible, as is known from the prior art, with a complete rotor and stator.

The machine elements thus produced will not be joined to form a closed ring until they are at the construction site. If the electric machine is installed in a wind-power plant as a wind generator, the pre-assembled machine elements can in an advantageous embodiment of the invention be mounted directly onto a flange of the wind-power plant's turbine so that the rotor's closed ring shape will be produced directly during mounting onto said flange. With that manner of assembly, in each case one rotor segment will be mounted on the flange simultaneously with one stator segment. The rotor's permanent magnets will be shielded by the stator segment also during the mounting operation. The stator segment and rotor segment will therein be spaced mutually apart in particular by the already mentioned connecting elements. The difficulties known from the prior art when a rotor having permanent magnets is inserted into a stator bore due to the strong magnetic forces of attraction and small air gap between the stator and rotor are eliminated by the inventive assembly method.

BRIEF DESCRIPTION OF THE DRAWING

The invention is described and explained in more detail below with the aid of the exemplary embodiments shown in the figures, in which.

DETAILED DESCRIPTION OF PREFERRED EMBODIMENTS

Figure 1:
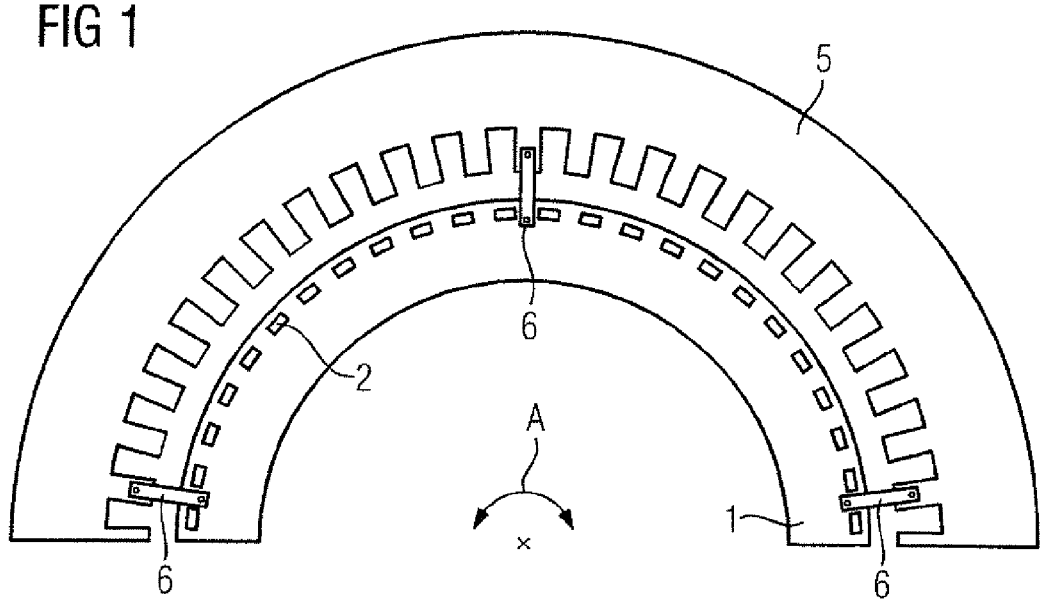
FIG. 1 shows a first embodiment of a machine element including a rotor segment and a stator segment.

FIG. 1 shows a first embodiment of a machine element including a rotor segment and stator segment 1, 5. Rotor segment 1 and stator segment 5 each span a 180° arc. When two rotor segments 1 having the structural shape shown are joined, the result will be a complete rotor of an electric machine having a hollow shaft.

Two stator segments 5 having the structural shape shown can likewise be augmented to form a closed ring so that the electric machine's complete stator will be produced.

The electric machine shown here is a permanently excited synchronous machine. Rotor segment 1, embodied here as an internal rotor, is correspondingly fitted with permanent magnets. The permanent magnets are embodied as concealed magnets, meaning they have been inserted into pouches embodied as disposed around the circumference on rotor segment 1. The permanent magnets can be pushed into these pouches in the axial direction.

As no kind of electric exciting is provided for the rotor shown here, its construction from two such segments is also very simple. No electric links have to be installed between rotor segments 1 during assembly.

Stator segment 5 is embodied having slots, not discernible here, into which coils for generating a rotating field are inserted.

Stator segment 5 fitted with the coils is initially rigidly joined via connecting elements 6 to rotor segment 1 fitted with permanent magnets, with an air gap via which the two segments are spaced mutually apart being ensured between rotor segment 1 and stator segment 5. These connecting elements 6 will not be released until the machine element shown that comprises rotor segment 1 and stator segment 5 has been assembled into a complete electric machine with another machine element of the same structural design. Not until stator segments 5 and rotor segments 1 have each been mounted on an annular flange will connecting elements 6 be released. With that type of assembly the permanent magnets of rotor segment 1 will be shielded by stator segments 5 during the entire assembly process. The risk of foreign components being drawn in by the permanent magnets' strong powers of attraction, thereby possibly causing damage to the machine or even to the people performing the assembly operation, will be prevented. What is in practice an extremely difficult assembly process where conventional large generators are concerned, in the case of which an operationally ready rotor has to be inserted into an operationally ready stator with the small air gap being maintained, will cease to apply.

Segmenting of the machine as presented into stator segments 5 and rotor segments 1 will for the first time enable electric machines to be scaled up to greater power outputs of 5 MW, 8 MW or, as the case may be, 10 MW at 10 to 15 rpm as is required of, for example, modern wind-power plants. Such machines require a rotor diameter of 12 to 14 m, as a result of which it is rendered virtually impossible to transport a complete rotor or complete stator by road.

Figure 2:
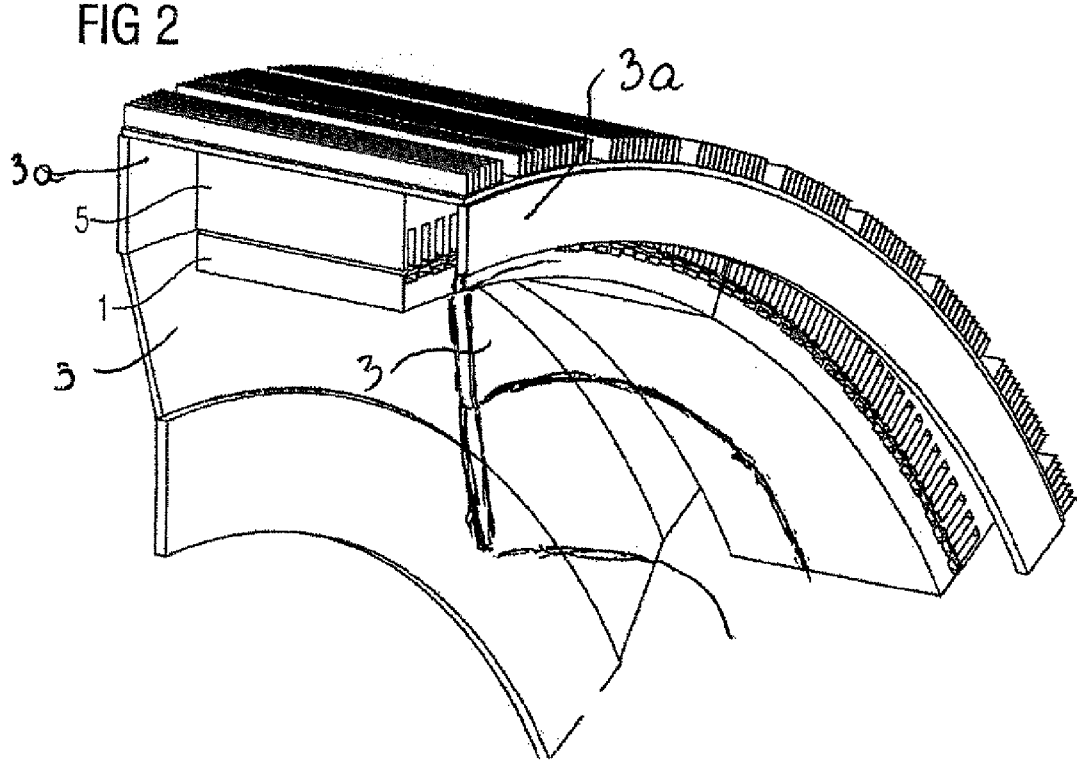
FIG. 2 shows a second embodiment of a machine element including a rotor segment and a stator segment.

FIG. 2 shows a second embodiment of a machine element comprising a rotor and stator segment 1, 5. Elements that operate functionally identically have here and throughout the application been assigned the same reference numerals.

In contrast to the machine element shown in FIG. 1, the machine element shown here contains only a 120 arc around an axis A of the rotor and stator. It would accordingly be necessary to join in each case three rotor segments 1 into an operationally ready rotor. The complete stator is analogously constructed from three of the stator segments 5 shown. To be seen in FIG. 2 is an annular flange 3 located on one axial side of the rotor, onto which the rotor segment 1 is mounted when the machine is being assembled. A corresponding annular flange 3a is provided also for the stator segment 5 on the same one axial side of the stator. Another annular flange 3 for mounting the rotor segment 1 and another annular flange 3a for mounting the stator segment 5 are provided on an opposite axial side of the rotor and the stator, which is axially spaced from the one axial side. Not until segments 1 have been fully mounted on the flanges together with the stator segments 5 in the form of arc-shaped machine elements will connecting elements 6 shown in FIG. 1 be released so that the machine will be capable of rotating.

Figure 3:
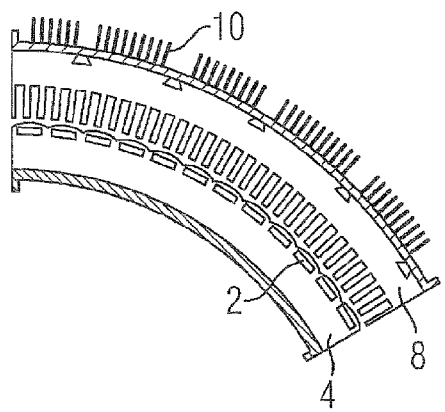
FIG. 3 shows forms of magnetic steel sheets of the segments of an internal-rotor generator having surface cooling.

FIG. 3 shows forms of magnetic steel sheets of the segments of an internal-rotor generator having surface cooling. What are shown are magnetic steel sheets 4 of the rotor which, stacked axially one upon the other, form the previously described rotor segments. Punched into these magnetic steel sheets 4 are holes by means of which the magnet pouches for accommodating permanent magnets 2 are formed. Permanent magnets 2 can be inserted into these magnet pouches in the axial direction.

Shown further are other magnetic steel sheets 8 for producing the stator segments. The later slot shapes have been punched into them. The other magnetic steel sheets 8 furthermore include cooling ribs 10 that enable surface cooling.

Figure 4:
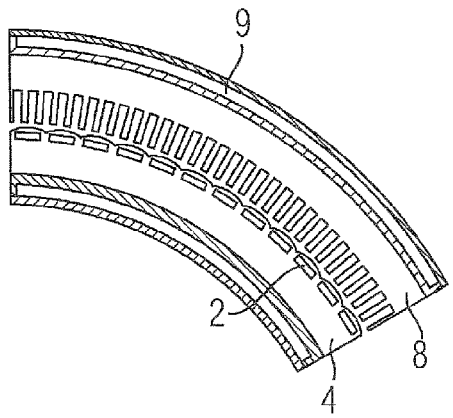
FIG. 4 shows forms of magnetic steel sheets of the segments of an internal-rotor generator having internal cooling.

FIG. 4 shows other forms of magnetic steel sheets of the segments of an internal-rotor generator having internal cooling. They contain radially extending cooling slots 9 for enabling internal cooling.

Figure 5:
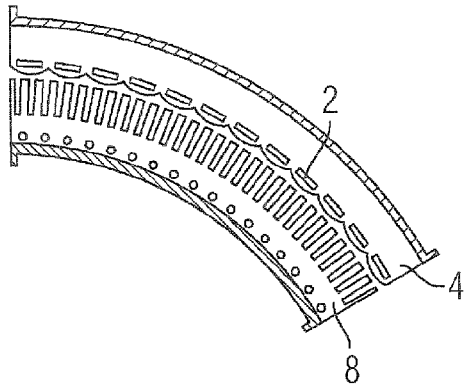
FIG. 5 shows forms of magnetic steel sheets of the segments of an external-rotor generator having surface cooling.
Figure 6:
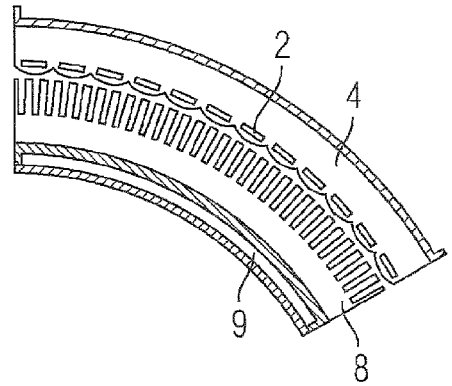
FIG. 6 shows forms of magnetic steel sheets of the segments of an external-rotor generator having internal cooling.

FIGS. 5 and 6 show forms of magnetic steel sheets for embodiments of the generator as an external rotor. The cooling concepts known already from FIGS. 3 and 4 can be realized also for an external rotor in conjunction with the inventive segmenting.

Figure 7:
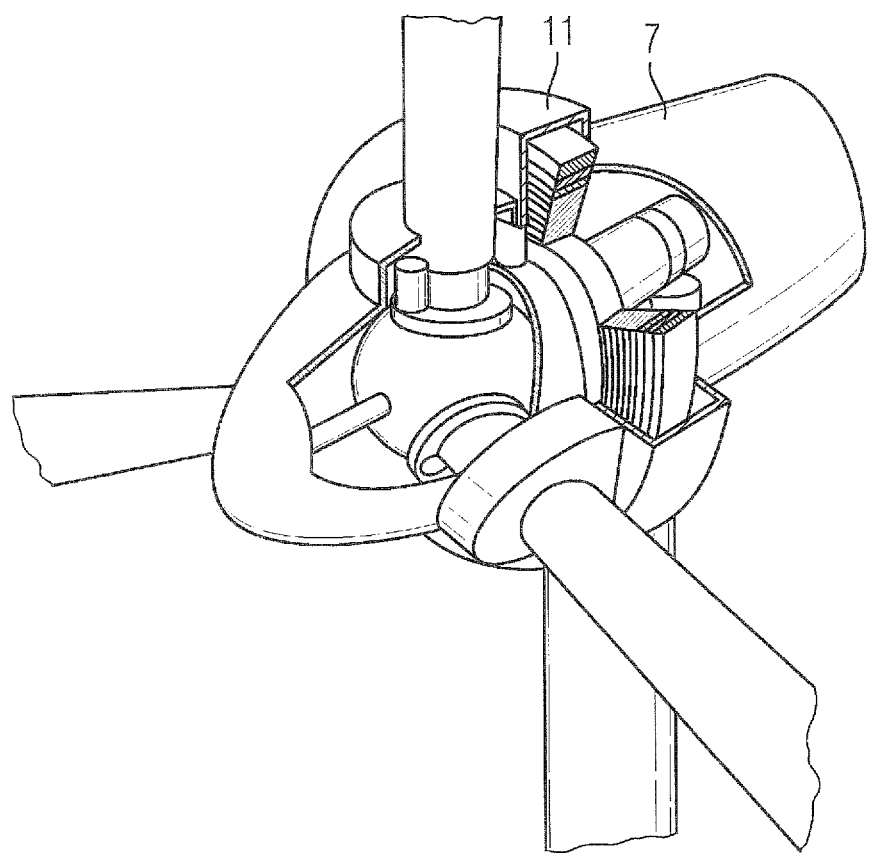
FIG. 7 shows a wind-power plant having an electric machine and a rotor designed according to an embodiment of the invention.

FIG. 7 shows a wind-power plant 7 having an electric machine 11 and a rotor designed according to an embodiment of the invention. The electric machine is embodied as a permanently excited synchronous machine having a hollow shaft. As already described previously in conjunction with the embodiment variants, the rotor and stator are constructed in a segmented manner. Because very large generators are used for the directly driven wind-power plant shown here, it is the stator's and rotor's segmented embodiment that for the first time will allow electric machine 11 to be transported by road to the wind-power plant's construction site.

The invention claimed is:

1. A generator of a gearless wind-power plant, said generator comprising:
an annular rotor subdivided circumferentially into a plurality of partially annular rotor segments and having a hollow shaft, said rotor having a closed ring shape which can be dissolved by separating the rotor segments from each other; and
a stator subdivided circumferentially into a plurality of partially annular stator segments, with a number of stator segments being the same as a number of rotor segments,
wherein the rotor segments and the stator segments are placed in one-to-one correspondence with arc-shaped circumferences defined by a substantially identical central angle around an axis of the rotor and the stator,
wherein the rotor has two front sides having two front faces spaced from one another in an axial direction,
wherein two annular flanges extend along the two front faces of the front sides of the rotor for connection of the rotor segments,
wherein the rotor segments include partially annular magnetic steel sheets stacked in an axial direction of the rotor.

2. The generator of claim 1, wherein the rotor constitutes an external rotor of the wind-power plant.

3. The generator of claim 1, wherein each rotor segment has at least one permanent magnet.

4. The generator of claim 3, wherein each rotor segment has a magnet pouch for receiving the permanent magnet.

5. A wind-power plant, comprising a generator including an annular rotor subdivided circumferentially into a plurality of partially annular rotor segments and having a hollow shaft, said rotor having a closed ring shape which can be dissolved by separating the rotor segments from each other, and a stator subdivided circumferentially into a plurality of partially annular stator segments, with a number of stator segments being the same as a number of rotor segments, wherein the rotor segments and the stator segments are placed in one-to-one correspondence and have arc-shaped circumferences defined by a substantially identical central angle around an axis of the rotor and the stator, wherein the rotor has two front sides having two front faces spaced from one another in an axial direction, wherein two annular flanges extend along the two front faces of the front sides of the rotor for connection of the rotor segments, wherein the rotor segments include partially annular magnetic steel sheets stacked in an axial direction of the rotor.

6. The wind-power plant of claim 5, wherein the rotor constitutes an external rotor of the wind-power plant.

7. The wind-power plant of claim 5, wherein each rotor segment has at least one permanent magnet.

8. The wind-power plant of claim 7, wherein each rotor segment has a magnet pouch for receiving the permanent magnet.

9. A method for producing a generator, comprising:
fitting a plurality of partially annular rotor segments with permanent magnets;
fitting a plurality of partially annular stator segments with coils;
joining the partially annular rotor segments to the partially annular stator segments in one-to-one correspondence to form a partially annular machine element around an axis of the rotor and the stator;
joining annular flanges to two front faces of opposite front sides of the rotor spaced from one another in an axial direction so that the annular flanges extend along the two front faces of the front sides of the rotor and connecting the rotor segments; and
joining a plurality of said machine element to form a closed ring.

10. The method of claim 9, further comprising mounting the machine element directly onto a flange of a turbine of a wind-power plant and mounting the plurality of joined machine elements on said flange.

11. The method of claim 9, wherein the rotor segments are produced by punching partially annular magnetic steel sheets and stacking the punched magnetic steel sheets in an axial direction of the rotor.

12. The generator of claim 1, wherein the stator has two front sides spaced from one another in the axial direction and each including a further annular flange for connection of the stator segments.

13. The wind-power plant of claim 5, wherein the stator has two front sides spaced from one another in the axial direction and each including a further annular flange for connection of the stator segments.

14. The method of claim 9, further comprising joining annular flanges to opposite front sides of the stator spaced from one another in the axial direction for connection of the stator segments.

15. The generator of claim 1, wherein the annular flanges are placed directly on the front faces of the rotor so that the annular flanges are in contact with the front faces of the rotor.

16. The wind power plant of claim 5, wherein the annular flanges are placed directly on the front faces of the rotor so that the annular flanges are in contact with the front faces of the rotor.

17. The method of claim 9, wherein the joining of the annular flanges includes placing of the annular flanges on the front faces of the rotor so that the annular flanges are in contact with the from faces of the rotor.

18. The generator of claim 1, wherein the stator has two front sides having two front faces spaced from one another in an axial direction, wherein further annular flanges extend along the front faces of the stator for connection of the stator segments, wherein at each front side of the rotor and the stator the annular flange and the further annular flange extend in a circumferential direction as a continuation of each other, and at each side of the rotor and the stator the annular flange and the further annular flange are in contact with each other.

19. The wind power plant of claim 5, wherein the stator has two front sides having two front faces spaced from one another in an axial direction, wherein further annular flanges extend along the front faces of the stator for connection of the stator segments, wherein at each front side of the rotor and the stator the annular flange and the further annular flange extend in a circumferential direction as a continuation of each other, and wherein at each side of the rotor and the stator the annular flange and the further annular flange are in contact with each other.

20. The method of claim 9, further comprising extending further annular flanges along two front faces of two front sides of the stator which are spaced from one another in an axial direction for connection of the stator segments, extending the annular flanges and the further annular flange in a circumferential direction as a continuation of each other at each front side of the rotor and the stator and also in contact with each other.

* * * * *